(12) United States Patent
Holmes

(10) Patent No.: US 10,002,335 B2
(45) Date of Patent: Jun. 19, 2018

(54) DYNAMIC WORKFLOW FOR REMOTE DEVICES

(75) Inventor: Richard Clayton Holmes, Harrisburg, NC (US)

(73) Assignee: Cardinal Logistics Management Corporation, Concord, NC (US)

( * ) Notice: Subject to any disclaimer, the term of this patent is extended or adjusted under 35 U.S.C. 154(b) by 1107 days.

(21) Appl. No.: 13/344,839

(22) Filed: Jan. 6, 2012

(65) Prior Publication Data

US 2012/0179625 A1 Jul. 12, 2012

Related U.S. Application Data

(60) Provisional application No. 61/430,273, filed on Jan. 6, 2011.

(51) Int. Cl.
*G06Q 30/00* (2012.01)
*G06Q 10/06* (2012.01)

(52) U.S. Cl.
CPC .............................. *G06Q 10/06316* (2013.01)

(58) Field of Classification Search
CPC ............. G06Q 10/08355; G06Q 10/08; G06Q 10/083; G06Q 10/0833; G06Q 10/06316; G06Q 10/06
USPC ........................................................ 705/338
See application file for complete search history.

(56) References Cited

U.S. PATENT DOCUMENTS

| 7,184,966 B1 | 2/2007 | Parsonnet et al. |
| 7,814,142 B2 | 10/2010 | Mamou et al. |
| 2006/0031340 A1 | 2/2006 | Mathew et al. |
| 2006/0074714 A1 | 4/2006 | Aziz et al. |
| 2006/0074789 A1 | 4/2006 | Capotosto et al. |
| 2007/0203737 A1 | 8/2007 | Boozer |
| 2008/0097810 A1* | 4/2008 | Sadowski et al. ................ 705/8 |
| 2009/0018983 A1 | 1/2009 | El Rafei et al. |
| 2009/0030770 A1* | 1/2009 | Hersh et al. ...................... 705/9 |
| 2009/0210140 A1* | 8/2009 | Short et al. ................... 701/117 |

FOREIGN PATENT DOCUMENTS

WO     WO 2004/075466     9/2004

OTHER PUBLICATIONS

Grasso, Antonietta, et al. "Distributed coordination and workflow on the world wide web." Computer Supported Cooperative Work (CSCW) 6.2-3 (1997): 175-200. (Year: 1997).*

* cited by examiner

*Primary Examiner* — George Chen
(74) *Attorney, Agent, or Firm* — Smith, Gambrell & Russell, LLP

(57) ABSTRACT

A dynamic workflow system and process for use in logistic support and management. The dynamic workflow system includes a central server that maintains all of the customer's requirements for each of its orders. The central server can generate unique workflows to follow to meet the requirements for each order submitted by the customers. The central server creates instructions from the workflows that it transmits to a remote device for an individual to follow in order to fulfill the customer's order. The remote device includes a shell program application which generates the workflows based upon the instructions received from the central server. The shell program application replaces the need for the remote device to store profiles for each customer that reflect their requirements.

12 Claims, 18 Drawing Sheets

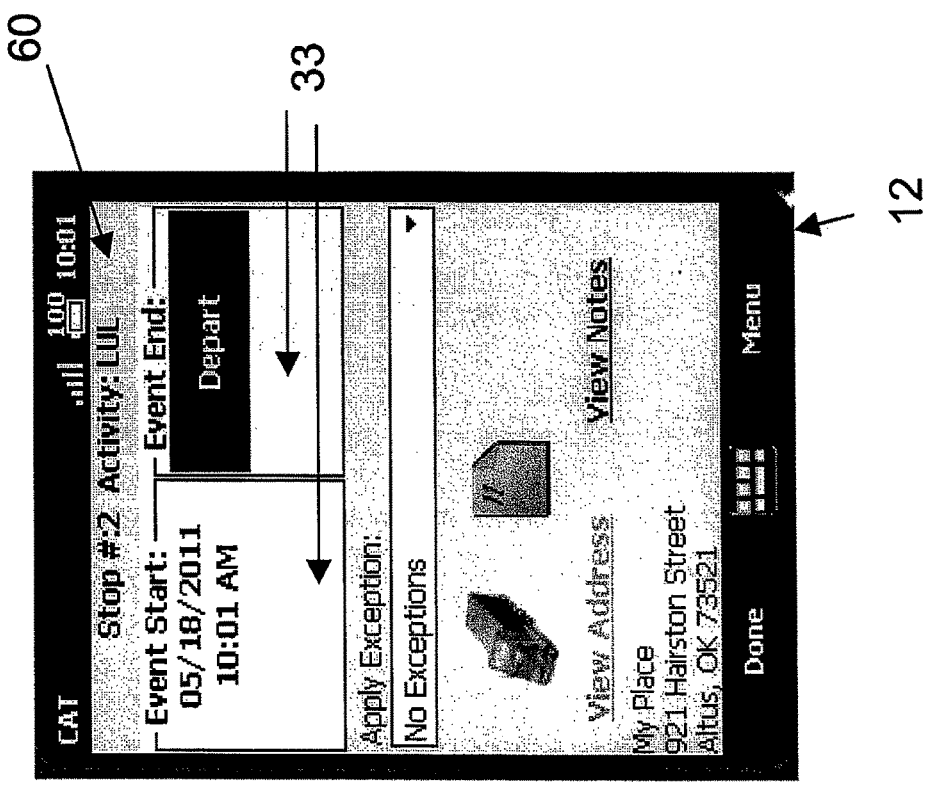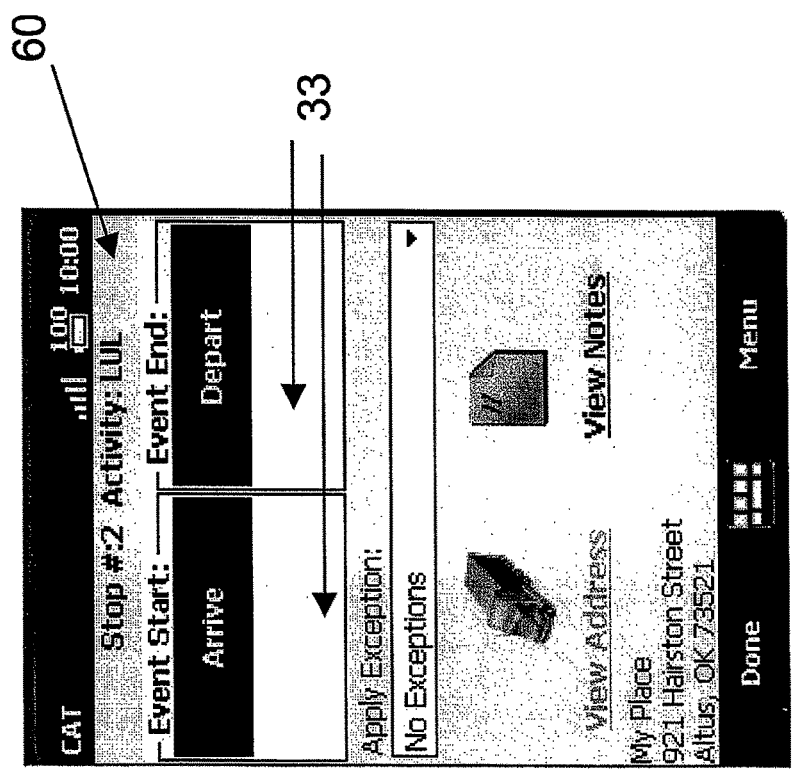
Fig. 20
Fig. 19

DYNAMIC WORKFLOW FOR REMOTE DEVICES

CROSS-REFERENCE TO RELATED APPLICATIONS

This application claims priority to U.S. Provisional Application No. 61/430,273, filed Jan. 6, 2011, which is incorporated herein by reference.

BACKGROUND OF THE INVENTION

Field of the Invention

The present invention generally relates to systems and methods for communicating workflows to remote devices used in logistic management and support services.

Description of the Related Art

One application of logistics management is the management of freight shipments. This process can be complex. Freight customers submit numerous order requests, which contain products that can be stored at numerous distribution centers and delivered to numerous customers at various locations. Further, many freight customers have unique requirements for the delivery of their products, ranging from how and when the products are to be transported to verifying the fulfillment of the order at delivery.

In order to ensure that these requirements are met, the common practice for the freight fulfillers has been to generate and follow workflows for each customer. Remote devices, including hand held devices such as the Motorola ES400 and MC55 and Symbol MC70, have been used to assist carriers in completing the workflows for each customer. In order to make sure that the workflow is completed as the customer requested, many hand held devices run systems that support all possible activities, requirements, and exceptions that are available for each workflow. Such systems, in order to complete a delivery, rely on a delivery person to know each customer's order requirements. Such systems further require that the delivery person select and fulfill the correct options and requirements for each job. As the number of entities that submit orders increases, each with their own unique set of requirements, the fulfillment process becomes dramatically more complex for the delivery person to collect the correct data and use the correct exception codes.

To combat this problem, the hand held devices can contain all customer profiles that have all of the unique requirements and exceptions for each job the delivery person handles. Such an arrangement has problems. First, each and every customer profile must be stored on the hand held device. This requires a significant amount of memory and processing power, which adds to the costs of the hand held devices. In addition, if the hand held device is lost, all the customer profiles can be accessible to anyone who may find the hand held device. In addition, every time a customer profile is added or modified, the hand held device itself must be reprogrammed, generating more costs and maintenance times. Therefore, there is a need for a dynamic workflow system that generates workflows on hand held devices in a cost and time efficient manner.

SUMMARY OF THE INVENTION

The present invention provides a dynamic workflow system and process for use in logistic support and management, as well as many other service based industries. The dynamic workflow system includes a central server that maintains all of the customer's requirements for each of the customer's orders. The central server can generate unique workflows to meet the requirements for each order submitted by each customer. The central server creates instructions from the workflows that the central server transmits to a remote hand held device for the delivery person to follow in order to fulfill the customer's order. The remote hand held device includes a shell program application that generates the local workflows based upon the instructions received from the central server. The shell program application replaces the need for the remote hand held device to store profiles for each customer that reflect each customer's requirements.

These and other objects and advantages of the invention will become apparent from the following detailed description of the preferred embodiment of the invention.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

FIGS. 19-21 are screen shots of a remote hand held device displaying various steps of a workflow method according to one embodiment of the present invention.

DETAILED DESCRIPTION OF THE PREFERRED EMBODIMENTS

Figure 1:
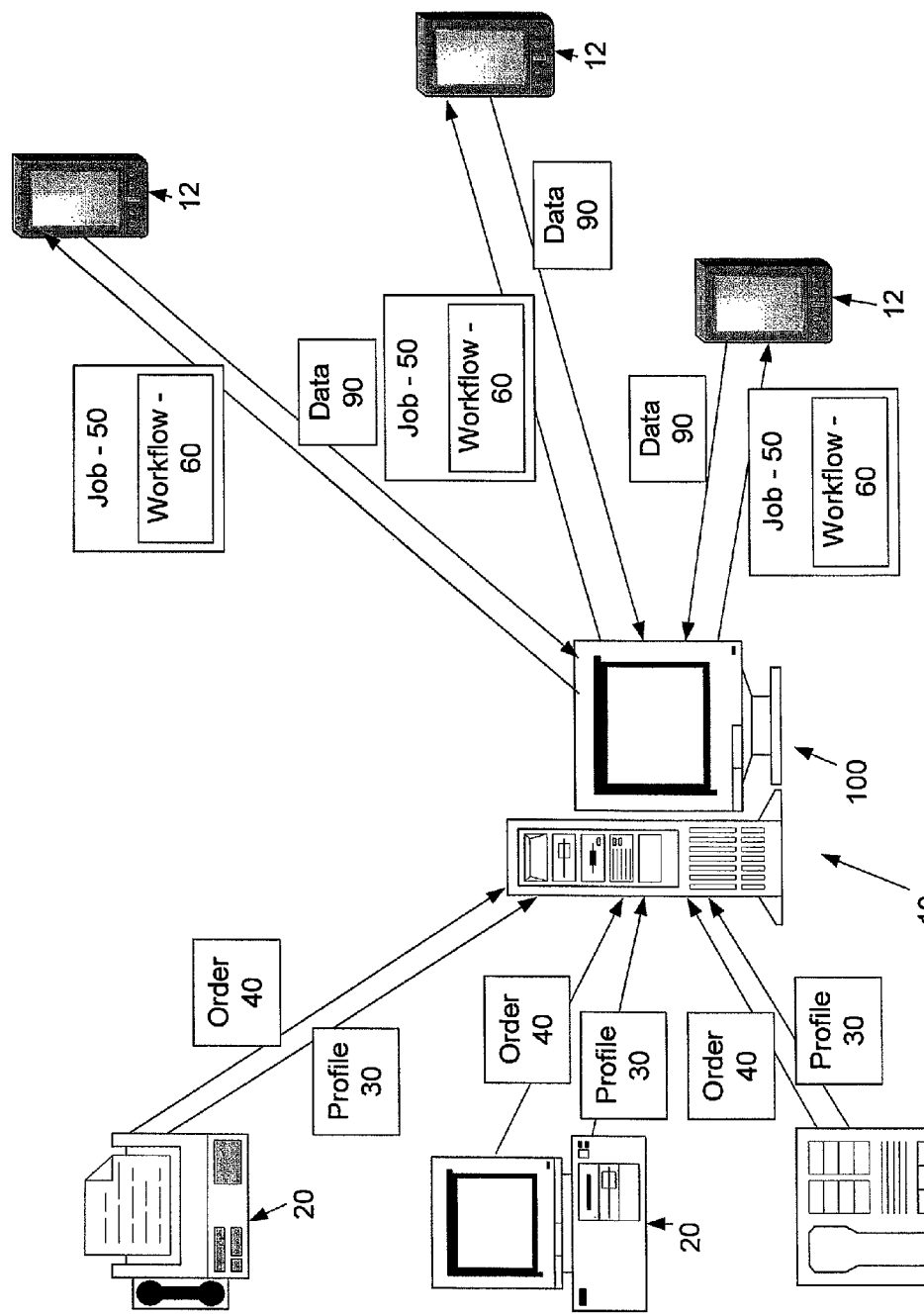
FIG. 1 is a block diagram of a dynamic workflow system according to one embodiment of the present invention.
Figure 2:
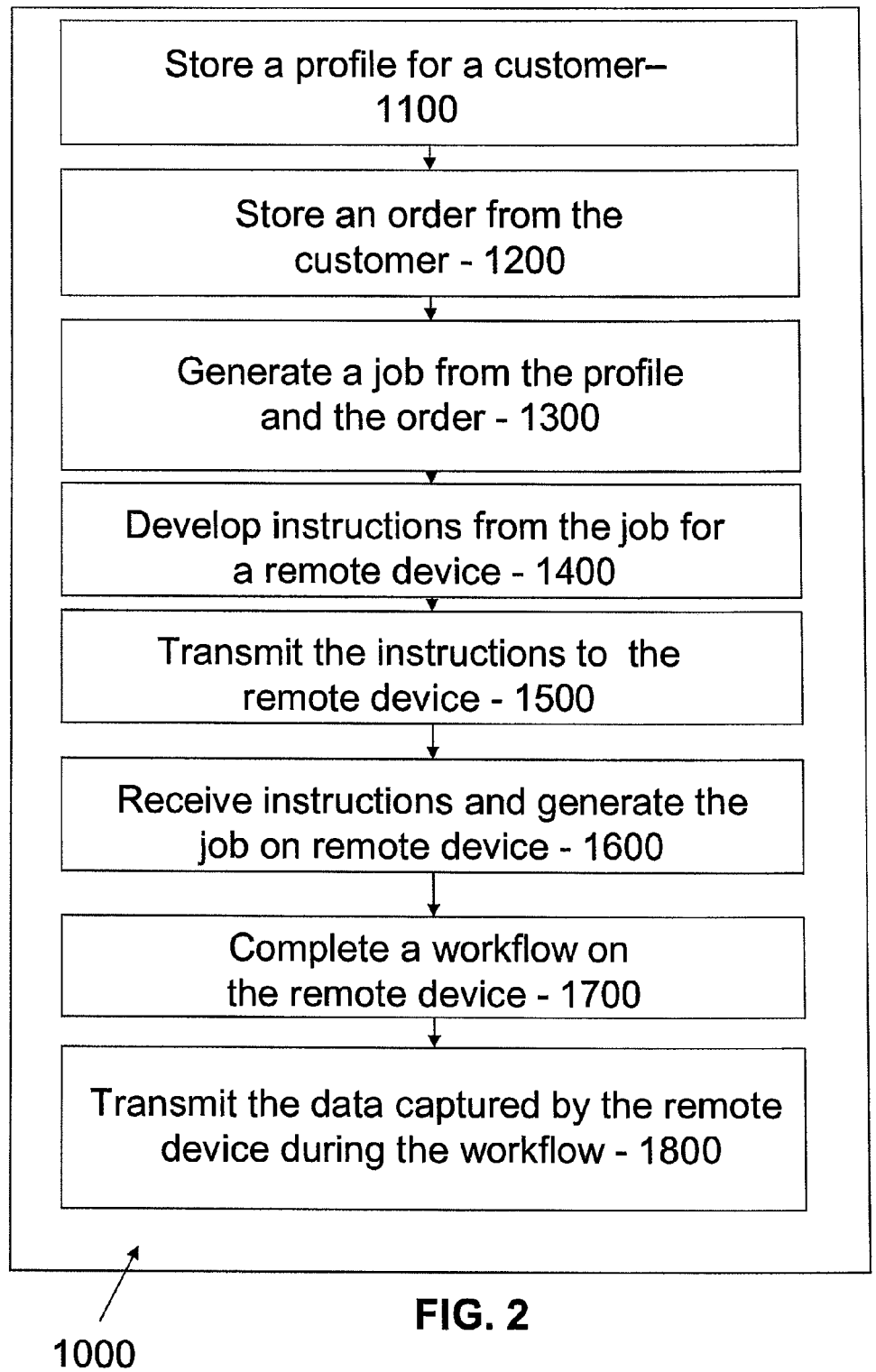
FIG. 2 is a flow diagram illustrating the operation of the dynamic workflow system according to one embodiment of the present invention.

Referring to the FIG. 1, the present invention is a dynamic workflow system 10 that generates workflows in accordance with customer requirements and transmits those workflows to remote hand held devices 12 to fulfill customers' orders in accordance with the customers' various requirements for those orders. FIG. 2 depicts a flow diagram 1000 that illustrates the operation of the dynamic workflow system 10 according to one embodiment of the present invention.

As shown in FIGS. 1-2 and 4-5, customers 20, either directly or through the assistance of a system administrator, load profiles 30 and orders 40 onto the dynamic workflow system 10. The dynamic workflow system 10 stores the profile 30 (step 1100 of FIG. 2) and the order 40 (step 1200 of FIG. 2) on the central server 100. The orders 40 and the profiles 30 are used by various software applications and/or software modules running on central server 100 as discussed in more detail below. The dynamic workflow system 10 generates jobs 50, including workflows 60, based on the customer profiles 30 and customer orders 40 (as shown in step 1300 of FIG. 2 and FIG. 3). The dynamic workflow system 10 develops instructions from the job 50 (step 1400 of FIG. 2). The instructions are then transmitted over a network 200 to the remote device 12 (step 1500 of FIG. 2). The instructions will then be interpreted by the remote device 12 to generate the job 50, including workflows 60 (step 1600 of FIG. 2). A delivery person will use the remote device 12 to complete the workflow 60 (step 1700 of FIG. 2), including collecting data 90 that is required by the workflow 60. Once a workflow 60 is completed, the remote device 12 collects data 90 as required by the workflow 60. The data 90 is then sent back to the central server 100 for access by the system administrator or by the customer (shown in step 1800 of FIG. 2).

Figure 4:
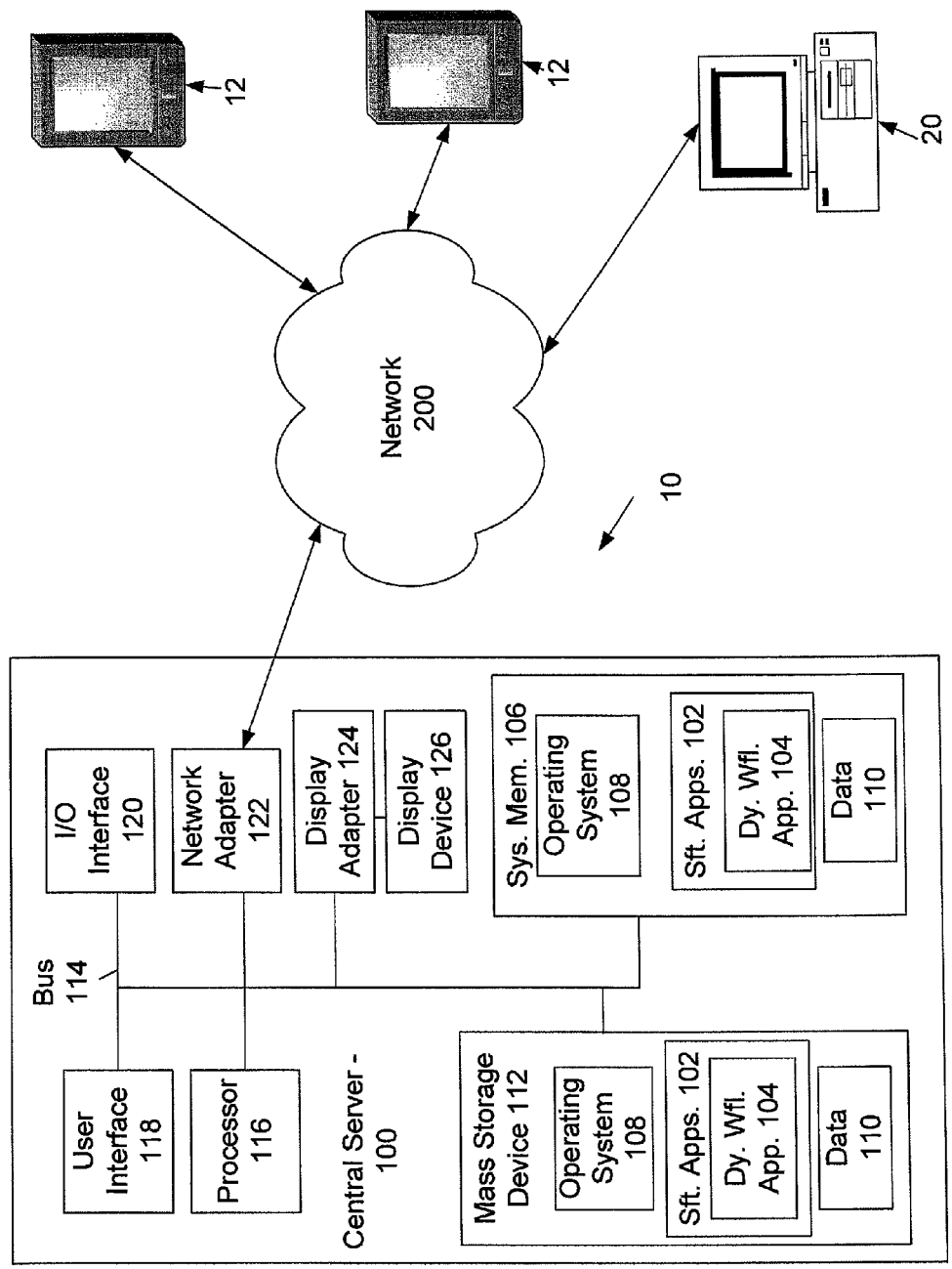
FIG. 4 is a detailed block diagram of the central server of FIG. 1 according to one embodiment of the present invention.

As shown in FIGS. 1 and 4, the dynamic workflow system 10 includes a central server 100. The central server 100 may have several applications 102, including a dedicated dynamic workflow application 104. The dynamic workflow system 10 is not limited to having multiple applications residing on a single central server 100. The dynamic workflow system 10 may utilize elements and/or modules of the various applications, including the dedicated dynamic workflow application 104 that may utilize several nodes or servers. In any event, the phrase dynamic workflow application 104 should be construed as inclusive of multiple modules, software applications, and other components.

With continuing reference to FIGS. 1 and 4, the central server 100 includes system memory 106, which can store the various software applications 102, including, but not limited to, the server's operating system 108 and the dynamic workflow application 104. The system memory 106 may also include data 110 accessible by the various software applications. The system memory can include random access memory (RAM) or read only memory (ROM).

Additionally, the central server 100 can include a variety of other computer readable media, including a mass storage device 112. The mass storage device 112 can be used for storing computer code, computer readable instructions, program modules, various databases, as discussed in further detail below, and other data for the server 100, and mass storage device 112 can be used to back up or alternatively to run the operating system 108 and/or other software applications 102, including the dynamic workflow application 104. The mass storage device 112 may include a hard disk, various magnetic storage devices such as magnetic cassettes or disks, flash drives, CD-ROM, DVDs or other optical storage, random access memories, and the like.

The central server 100 may include a system bus 114 that connects various components to the system memory 106 and to the mass storage device 112, as well as to each other. Other components of the central server 100 may include one or more processor or processing units 116, a user interface 118, an input/output interface 120, and a network adapter 122 that is configured to communicate with other devices over various networks 200 to which the central server 100 is connected. In addition, the central server 100 may include a display adapter 124 that communicates with a display device 126, such as a computer monitor and other devices that present images and text in various formats.

A system administrator can interact with the dynamic workflow application 104, and other software application 102, on the central server 100 through one or more input devices (not shown), which include, but are not limited to, a keyboard, a mouse, a touch-screen, a microphone, a scanner, a joystick, and the like, via the user interface 118. In addition, customers 20 can interact with certain modules of the dynamic workflow application 104 via the internet or other various networks 200, discussed in more detail below.

Data 110 stored on the central server 100 may be any type of retrievable data. The data may be stored in a wide variety of databases, including relational databases, including, but not limited to, Microsoft Access and SQL Server, MySQL, INGRES, DB2, INFORMIX, Oracle, PostgreSQL, Sybase 11, and the like.

As discussed above, the dynamic workflow application 104, through the network adapter 124, communicates with remote devices 12 over the network 200. The network 200 can be any type of network, or combination therefore, that allows the transmission of data to and from the dynamic workflow application 104 and the remote devices 12. The networks 200 can include local area networks, (e.g. Wi-Fi, Ethernet networks, and others that operate on the IEEE 802 family of standards), wide area networks (Internet), cellular networks (GPRS, CDMA, FDMA, GSM, EV-DO, EDGE, 3GSM, and DECT), telephonic networks, and any combination of the like.

Figure 5:
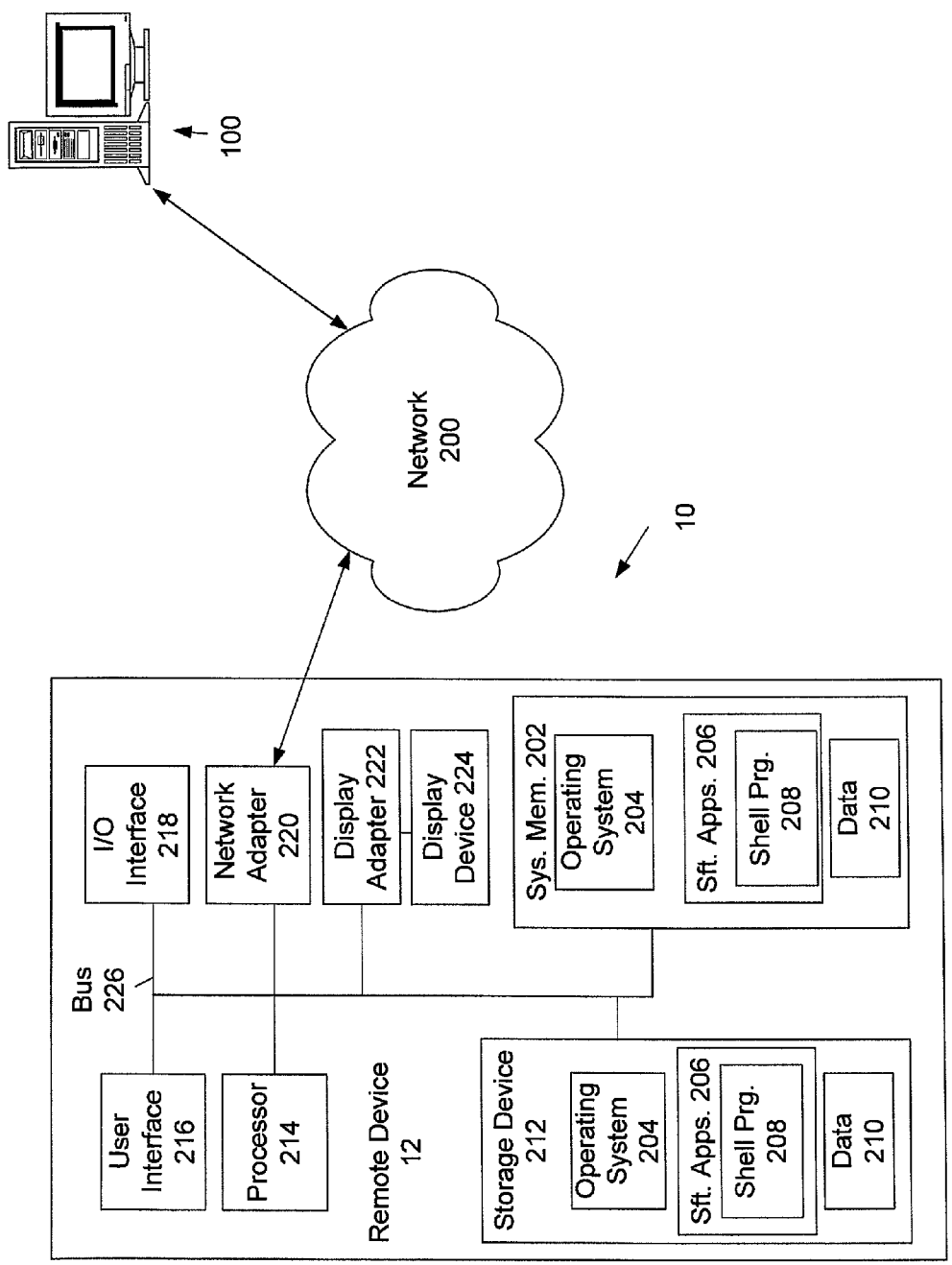
FIG. 5 is a detailed block diagram of the remote hand held device of FIG. 1 according to one embodiment of the present invention.

As shown in FIG. 5, each remote device 12 includes its own system memory 202, which stores the operating system 204 and various software applications 206, including, but not limited to, a shell program application 208, discussed in detail below. The remote device 12 may also include data 210 that is accessible by the operating system 204 and the software applications 206 and 208. The remote device 12 may include a storage device 212 and operate in a similar fashion to the storage devices of the central sever 100 as discussed above. The remote device 12 may include a processor 214, a user interface 216, an input/output interface 218, a network adapter/transceiver 220, a display adapter 222 that communicates with a display device 224, and various input devices as discussed above that are connected by a system bus 226. Examples of the remote devices include, but are not limited to, PC's, laptops, smart phones, PDA's, hand held computers, and the like. The preferred embodiment of the invention utilizes hand held devices, such as the Motorola ES400 and MC55, Symbol MC70, and other hand held devices supplied by Arrow, Honeywell, Dolphin, and Intermec. The remote devices may operate on a variety of operating platforms, including, but not limited to, those Android, Blackberry OS, iOS, Symbian OS, webOS, PalmOS, bada, GridOS, Blackberry Tablet, Blackberry BBX, SHR, MeeGo, Windows Mobile and Phone, Linux, Brew, LiMo 4, and the like.

As stated above, each of the remote devices 12 includes a shell program application 208. The shell program application 208 receives the instructions transmitted by the dynamic workflow system 10 and utilizes the instructions to generate the various workflows 60 for the delivery person to follow as discussed in further detail below. The instructions from the central server 100 may come in the form of, but are not limited to, XML, EDI, FTP, CSV, Spread Sheets, Text, flat files, and the like for the shell program application 208 to interpret. The shell program application 208 may be any generic shell program, and can include, but not limited to, Unix, Windows, Windows Mobile, XML and the like. From the instructions received, the shell program 208 may generate the workflows 60 including detailed steps for the delivery person to follow. Various user interfaces can be used by the remote devices 12, such as, but not limited to, GUIs, touch screens, command line, touch user interfaces, and the like.

Figure 6:
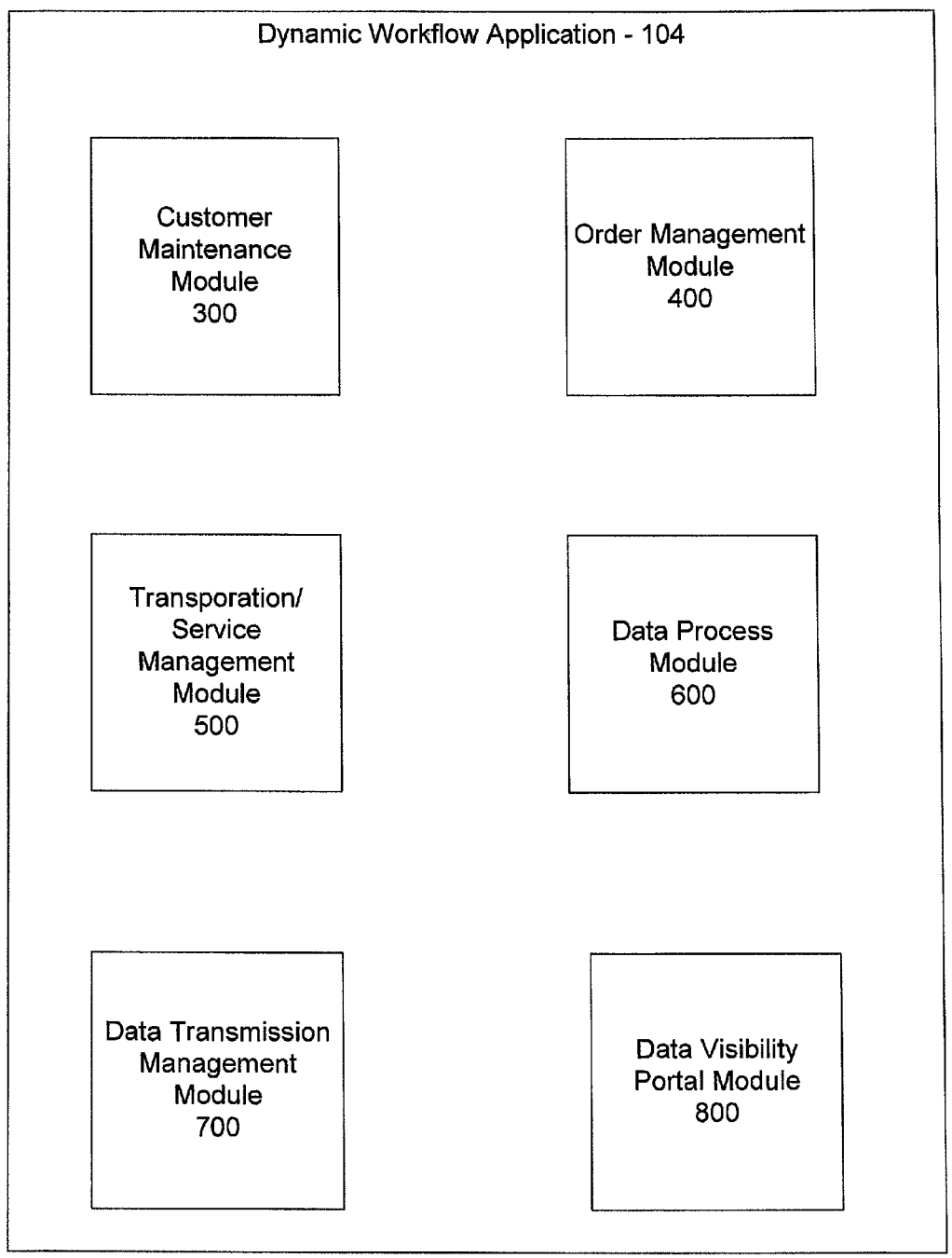
FIG. 6 is a block diagram of a component of the central server of FIG. 1 according to one embodiment of the present invention.

As shown in FIG. 6, the dynamic workflow application 104 residing on the central server 100 may include several functional modules, including a Customer Maintenance Module 300, an Order Management Module 400, a Transportation/Service Management Module 500, a Data Process Module 600, a Data Transmission Management Module 700, and a Data Visibility Portal Module 800. These modules 300, 400, 500, 600, 700, and 800 perform certain functions for the dynamic workflow system 10, discussed in detail below. However, the dynamic workflow system 10 is not limited to having all of these functions performed by the modules 300, 400, 500, 600, 700, and 800 held in a single application such as the dynamic workflow application 104. In other embodiments of the present invention, the functionality provided by these modules may actually be carried out by modules found in separate software applications.

The Customer Maintenance Module ("CMM") 300 creates the profiles 30 for the customers, as well as collects, updates, and maintains the customer's information in the profiles 30. The CMM 300 can be used by a system administrator to enter in the customer's information. Customers can transmit their information to the system administrator via fax, over the Internet (email), and over the phone. Customer information may be sent through other communications means as well, including, but not limited to, mail and in person. In some embodiments of the current invention, a customer may supply the information directly to the CMM 300, including through a webpage entry, EDI, XML, and the like.

Figure 7:
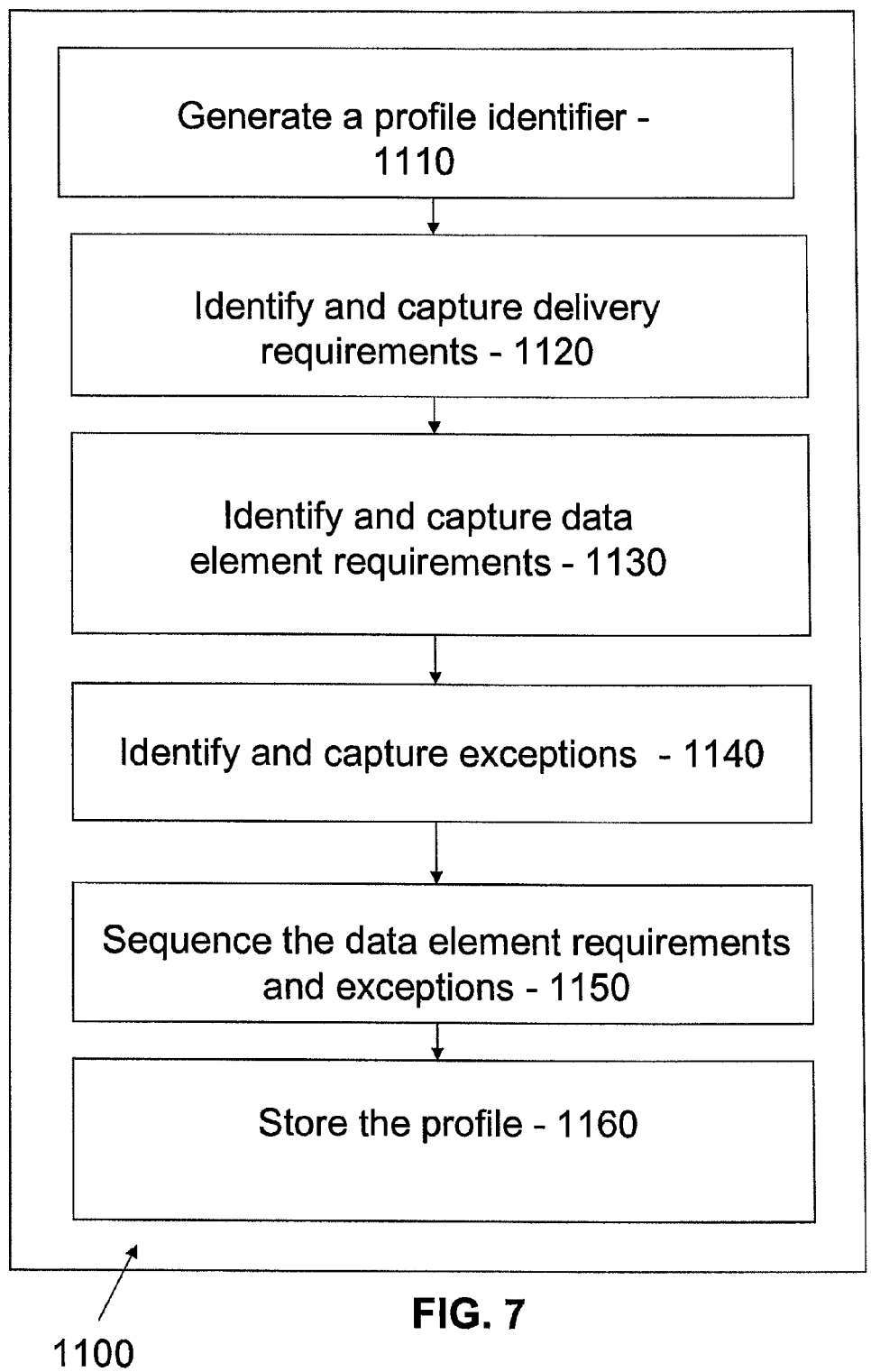
FIG. 7 is a detailed flow diagram illustrating the creation of selected portions of the dynamic workflow method of FIG. 2.
Figure 8:
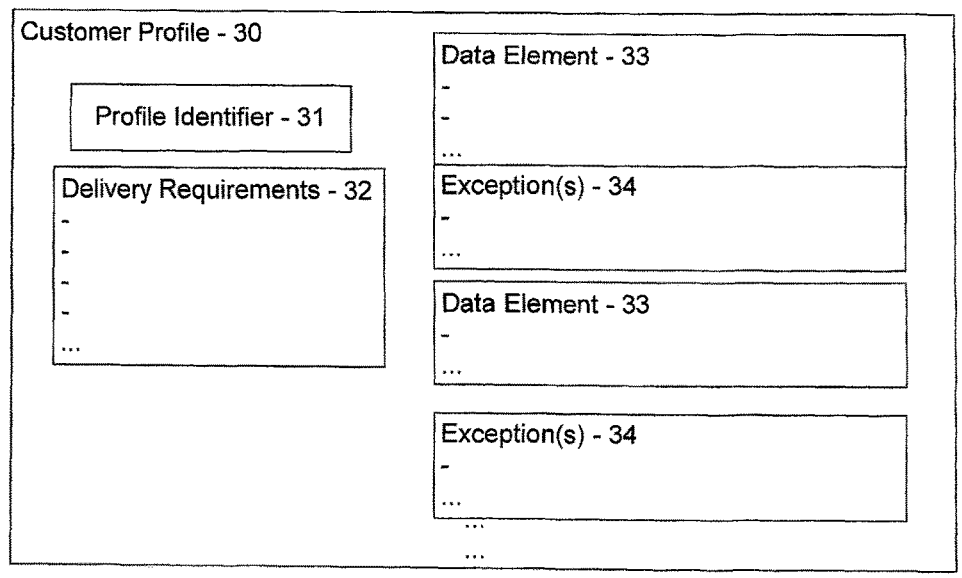
FIG. 8 is a block diagram of a customer profile according to one embodiment of the present invention.

The CMM 300 uses the customer information to generate the profile 30 (see flow diagram 1100 of FIG. 7). As shown in FIG. 8, the profile 30 may include a profile identifier 31, delivery requirements 32, data element requirements 33, and exceptions 34. Profiles 30 are set up either at a customer level or on an order level. The order level is used when a single customer has the need for different delivery requirements for different order types. For example, a customer may need a first product that can be shipped in any type of trailer. The same customer may have a second product that is a frozen food item, which would require the frozen food item to be shipped in a refrigerated trailer and inspected upon delivery. The order for the second product would require different delivery requirements than those of the first product. The CMM 300 must be able to keep track of the differences between the two products, and therefore the CMM 300 must generate profiles 30 at different levels.

The profile identifier 31 is used to identify an individual profile 30. The profile identifier 31 can be manually entered by an administrator or automatically generated by the CMM 300, and can be based upon the customer identity or at the order level (step 1110 of FIG. 7).

The CMM 300 identifies and captures delivery requirements 32 from the customer supplied information (step 1120 of FIG. 7). The delivery requirements 32 (FIG. 8) are requirements that are standard for each delivery using the given profile 30, and do not require the delivery person to carry out any actions during delivery or execution of the workflow. Such delivery requirements 32 can include, but are not limited to, driver requirements, trailer management requirements, GPS settings, delivery times (if necessary), and other items that the customer requires for its orders.

With continuing reference to FIG. 8, data element requirements 33 include actions that the delivery person must execute. For example, data element requirements 33 include, but are not limited to, arrival entry, required scan of product delivered, collecting credentials, inspecting products, displaying manifests, release requirements, collection of returns, obtaining recipient information, collecting a signature, closing a delivery order, departure time, and the like. The CMM 300 can identify and capture the delivery element requirements 33 from the customer supplied information (step 1130 of FIG. 7).

The CMM 300 may identify and capture the exceptions 34 (FIG. 8) from the customer supplied information as well (step 1140 of FIG. 7). Exceptions 34 provide a means for the delivery person to address problems that occur during delivery of an order 40. Exceptions 34 can be correlated to the data element requirements 33, or can apply to an order in general. For example, if a customer requires all products to be scanned upon delivery as a data element requirement 33, but one of the products cannot be scanned due to a faulty barcode, an exception 34 may be substituted in place of the data element requirement 33. Refusal to accept delivery due to product damage or failure to deliver products due to weather conditions are general exceptions 34. The exceptions 34 can also be classified as hard or soft. A soft exception 34 allows a delivery to continue if a data element requirement 33 cannot be met (e.g., a customer accepts a package with a faulty bar code). A hard exception 34 terminates a delivery.

Exceptions 34 may include, but are not limited to, missed delivery appointment window, improper security clearance, products refused because of damage, mechanical failure, bad weather, customer not at home, customer is not ready for delivery, wrong product is provided, incomplete order, and the like. Similar to the data element requirements 33, the possible data element exceptions 34 are dependent upon the customer's requirements, and therefore are unlimited.

In addition, the customer can specify when exceptions 34 are required and to what data element requirements 33 the exceptions 34 are assigned, if any. Once the data elements requirements 33 and exceptions 34 have been identified and captured, both should be placed in a sequence dictated by the customer's needs (step 1150 of FIG. 7). Once a profile 30 is generated, it may be stored on the central server 100 (step 1160 of FIG. 7). The customer profile 30 can be accessed for updates by the CMM 300 or by other modules for later use or modification based upon the customer's needs.

With reference to FIG. 6, the Order Management Module ("OMM") 400 receives orders 40 (FIG. 1) from the customers 20. Orders 40, similar to profiles 30, can be submitted by customers 20 to the system administrator via fax, over the internet (email), over the phone, in the mail, and in person. In some embodiments of the current invention, a customer may supply the order 40 directly to the OMM 400, including through a webpage entry, EDI, XML, and the like. In other embodiments, the system may automatically generate an order 40. For example, a customer may set up in its profile 30 that a given product is to be delivered automatically once a week. The CMM 300, or other modules, can generate the order 40 and send the order 40 to the OMM 400.

Figure 9:
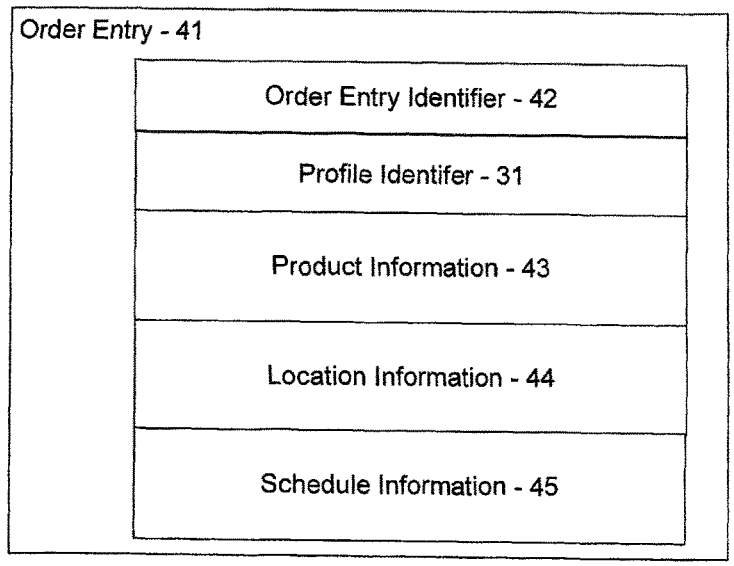
FIG. 9 is a block diagram of an order entry according to one embodiment of the present invention.
Figure 10:
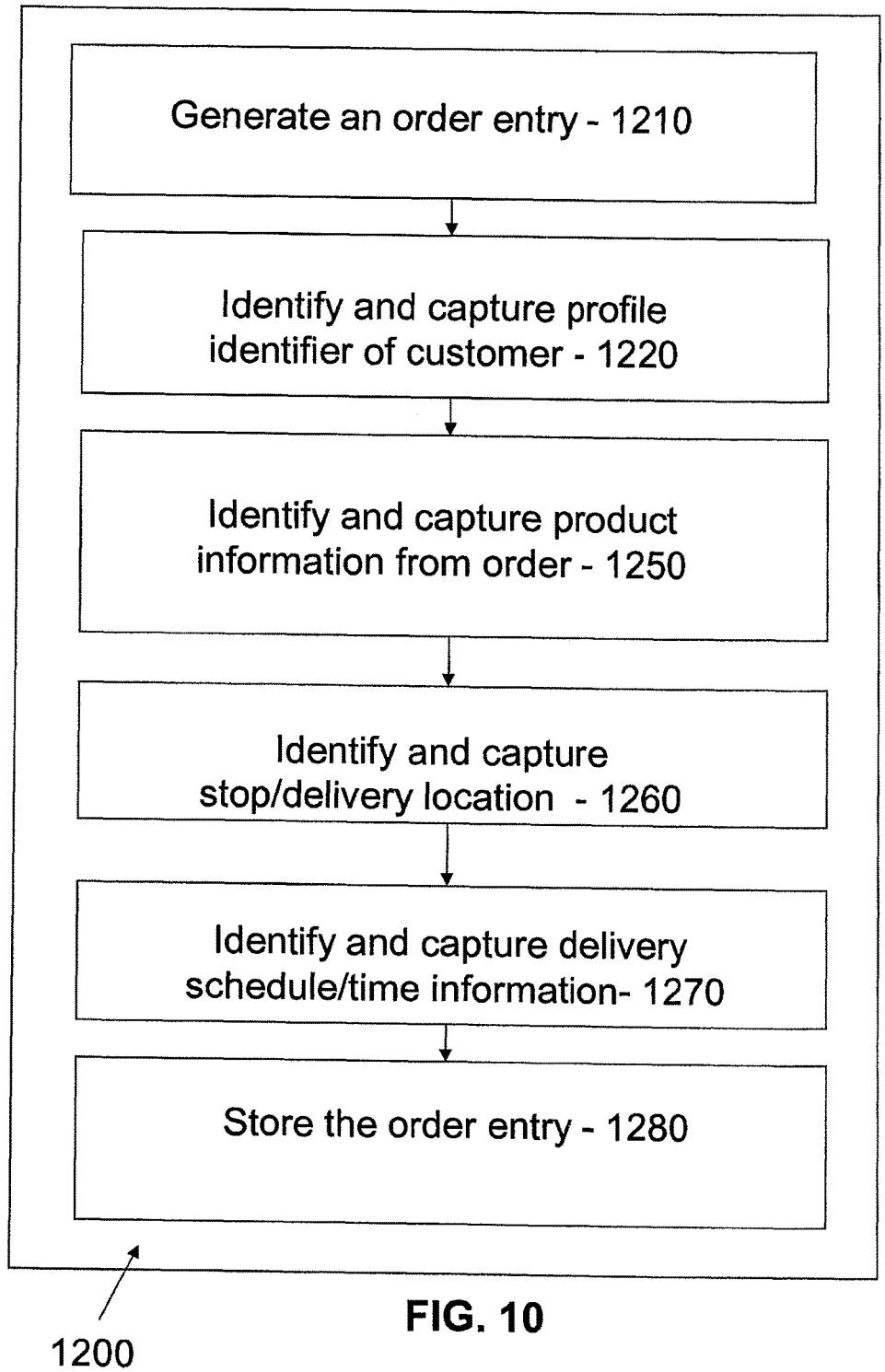
FIG. 10 is a more detailed flow diagram of selected portions of the dynamic workflow method of FIG. 2
Figure 11:
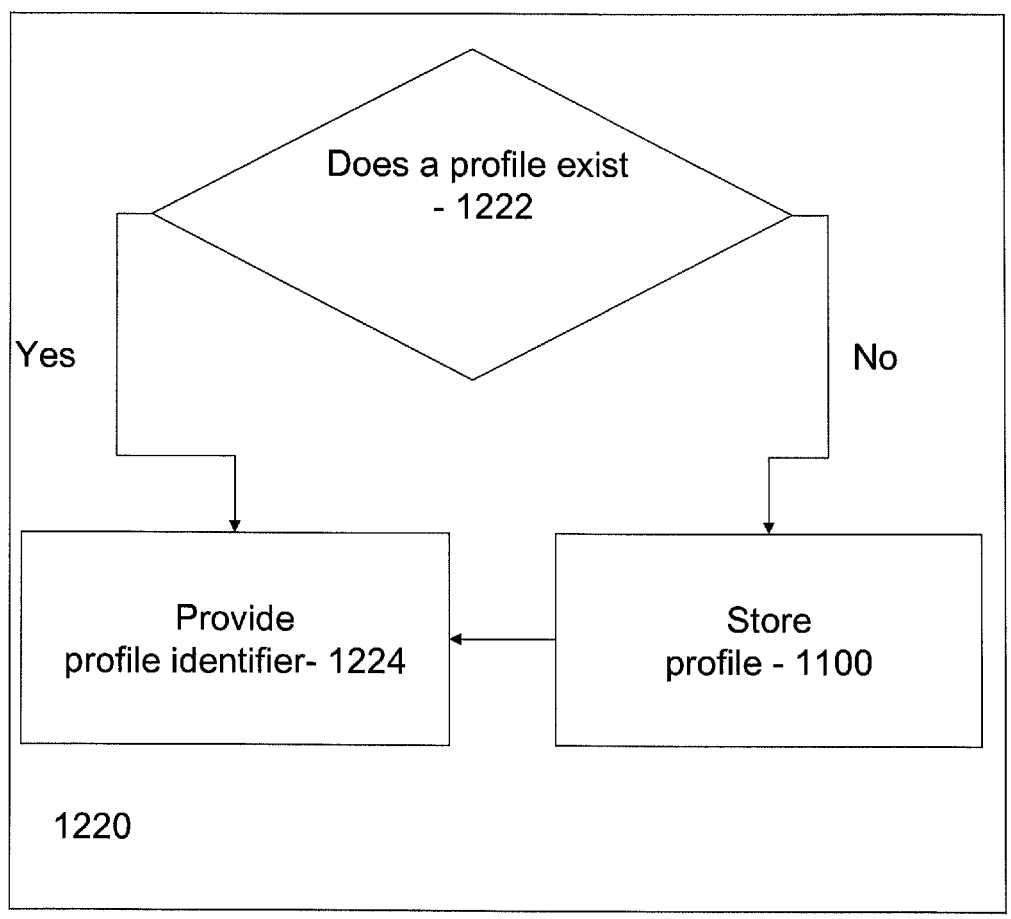
FIG. 11 is a more detailed flow diagram of selected portions of the dynamic workflow method of FIG. 10.

Upon receipt of an order 40 (step 1200 of FIG. 2), the OMM 400 generates an order entry 41 (FIG. 9), including an order entry identifier 42 for each order 40 (step 1210 of FIG. 10). From the order 40, the OMM 400 identifies and captures the profile identifier 31 (FIG. 8) of the corresponding profile 30 (step 1220 of FIG. 10). Profiles 30 may be created in advance of receiving an order 40 from a customer, or upon receipt of an order 40. When an order 40 is received, the dynamic workflow system 10 can call on either the CMM 300 or OMM 400 to determine if there is a corresponding profile 30 for the order (step 1222 of FIG. 11). If the profile 30 does exist, the profile identifier 31 is incorporated into the order 40 (step 1224 of FIG. 11). If not, the CMM 300 will create a customer profile 30 from customer supplied information for inclusion in the order 40 (step 1130 of FIG. 11).

The OMM 400 also identifies and captures the product information 43 (FIG. 9) from the order 40 as well (step 1150 of FIG. 10). The product information 43 identifies the product being ordered and the amount ordered. In addition, in some embodiments, the product information 43 may also include the dimensions of the product, SKU information, barcode information the weight of the product, the cost of the product, the delivery cost for the product, and other information, including special delivery means. This product information 43 may be extracted from either the order 40 or the corresponding customer profile 30, or a combination of both.

The order 40, or corresponding profile 30, may also include a stop/delivery location 44 (FIG. 9), and delivery schedule/time requirements 45 (FIG. 9). The OMM 400 will capture stop/delivery location information 44 and the delivery schedule/time requirements 45 and enter such information into the order entry 41 (steps 1160 and 1170 of FIG. 10). The customer may supply this information for each order the customer requests or the order 40 may be automatically generated based upon the corresponding profile 30. The order entry 41 (FIG. 9) may be saved upon its completion and accessed for later use by the dynamic workflow application 104, as well as other applications of the dynamic workflow system 10.

Figure 3:
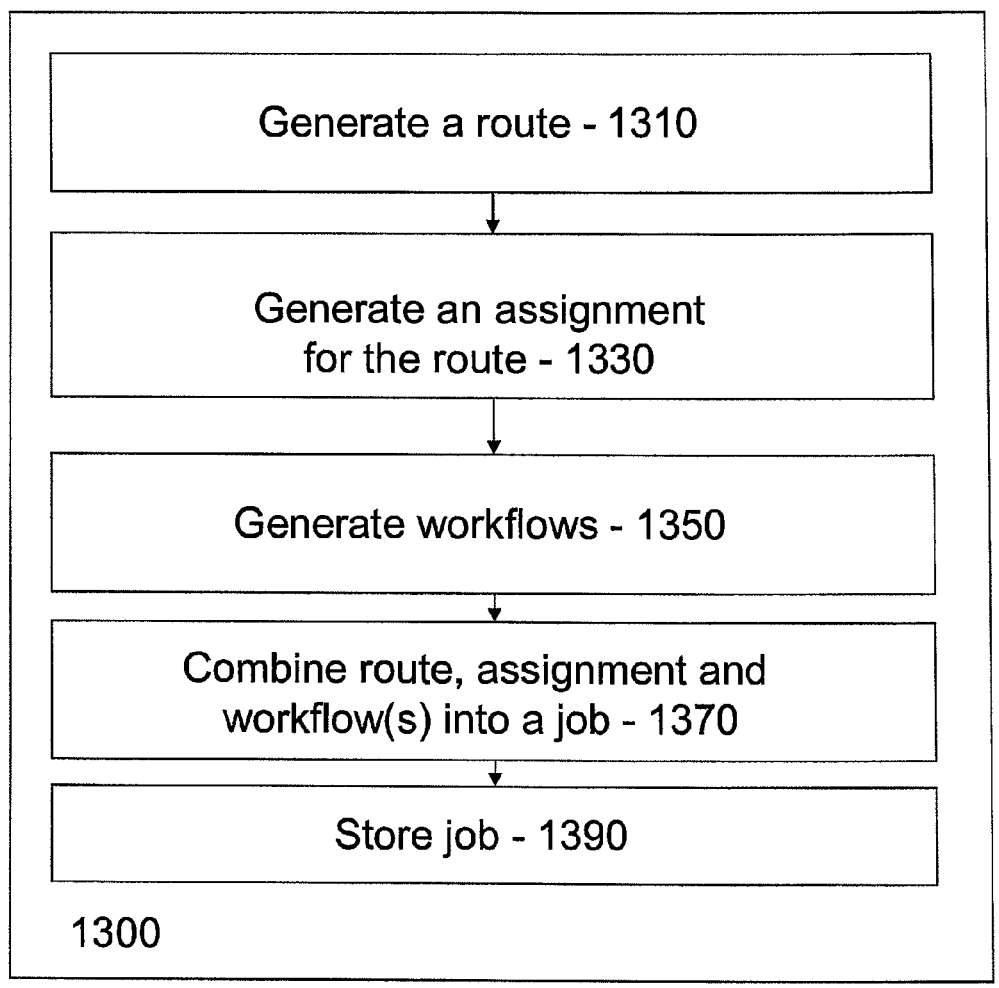
FIG. 3 is a more detailed flow diagram of selected portions of the dynamic workflow method of FIG. 2.
Figure 12:
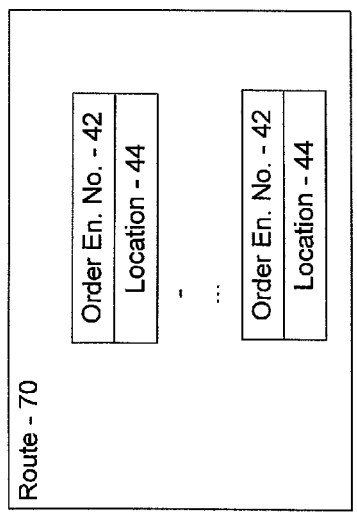
FIG. 12 is a block diagram of a route according to one embodiment of the present invention.

The OMM 400 also assists in generating jobs 50 (step 1300 of FIGS. 2 and 3) by generating routes 70, as shown in FIG. 12, from information within one or more order entries 41 (step 1310 of FIG. 3). Routes 70 can be formed from individual orders 40 or combined multiple individual orders 40. The route 70 dictates to the delivery person how many orders he or she will fulfill. The routes 70 may be formed in a variety of methods. For example, in some embodiments of the invention, the routes 70 may be generated manually and entered into the OMNI 400 by the system administrator. In other embodiments of the present invention, the OMM 400 may generate routes 70 automatically based upon information in the customer profile 30 (including the shipping requirements 32 (FIG. 8) and data element requirements 33 (FIG. 8)), from order entries 41 (including the product information 43 and the delivery/stop location 44) or information in the orders 40 themselves. At a minimum, the route 70 includes information from the order 40 retained in the order entry 41, including the stop/delivery location 43. Once completed, the route 70 can be stored at the central server 100.

After a route 70 is created, the Transportation/Service Management Module ("TSMM") 500 (FIG. 6) can create an assignment 80 for the route 70 (step 1330 of FIG. 3). The TSMM 500 may be used to manage a fleet of assets. It may be a home grown solution, or an off-the-shelf module that can be incorporated into the dynamic workflow application 104. The TSMM 500 can perform many functions, including, but not limited to, tractor management and assignment, driver management and assignment, trailer management and assignment, generating directions for routes, providing special instructions and requirements for each order, generating and storing billing information, settlement/driver and/or carrier payment information, and unscheduled service requests. The TSMM 500 can call on the other modules, including the CMM 300 and ODM 400, to acquire the information it needs to create assignments 80 based upon information found in the customer profiles 30 (FIG. 8) and order entries 41 (FIG. 9).

Figure 13:
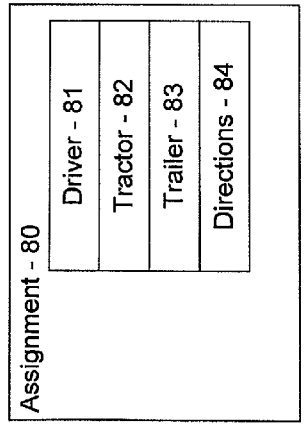
FIG. 13 is a block diagram of an assignment according to one embodiment of the present invention.

The TSMM 500 can generate an assignment 80 (FIG. 13) that corresponds to the requirements for orders 40 assigned to a specific route 70. The assignment 80 may include a driver assignment 81, a tractor assignment 82, and a trailer assignment 83. In addition, the TSMM 500 may generate directions 84 to follow from location to location. The TSMM 500 can base these assignments 80 on the delivery requirements 32 (FIG. 8) associated with the orders. Once completed, the assignment 80 can be saved by the central server 100 for later use.

Figure 14:
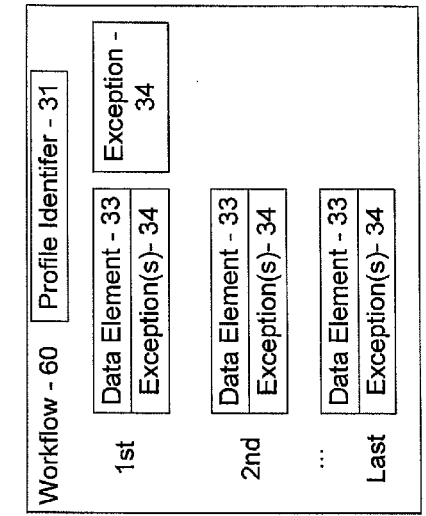
FIG. 14 is a block diagram of a workflow according to one embodiment of the present invention.
Figure 15:
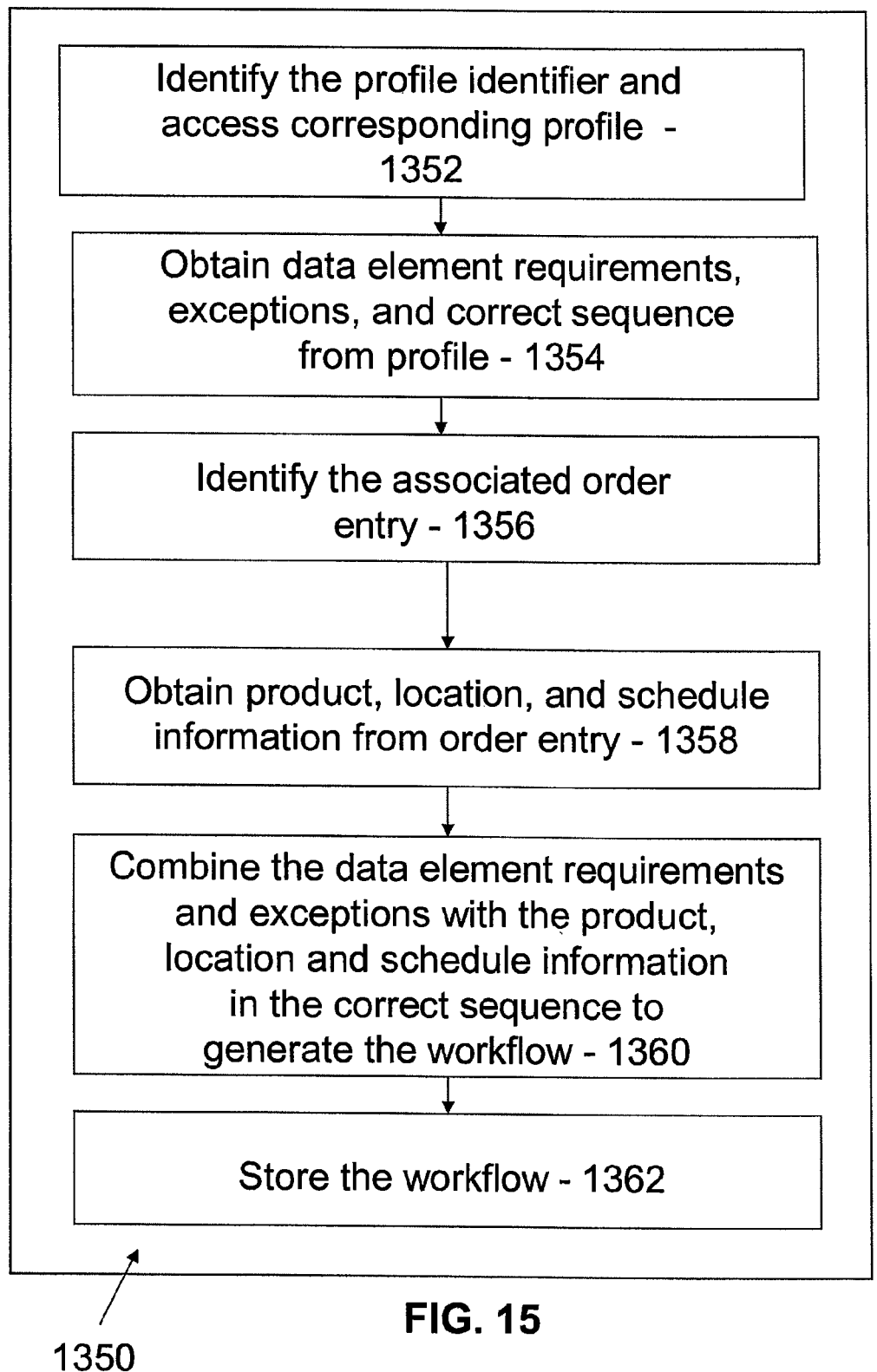
FIG. 15 is a more detailed flow diagram of selected portions of the dynamic workflow method of FIG. 3.

The information generated by the CMM 300, the OMM 400, and the TSMM 500 (FIG. 6) may then be utilized by the Data Process Module ("DPM") 600 to generate unique workflows 60 (Step 1350 of FIGS. 3 and 15). An example of a generated workflow is shown in FIG. 14. Workflows 60 are generated for each order 40 that is assigned to a route 70. The DPM 600 identifies the profile identifier 31 (FIG. 9) associated with each order 40 and accesses the profile 30 (FIG. 8) for needed information, as shown in step 1352 of FIG. 15. The DMPM 600 obtains the data element requirements 33 (FIG. 8), exceptions 34 (FIG. 8), and the sequence of the data element requirements 33 and any corresponding exceptions 34 (step 1354 of FIG. 15). The DPM 600 then identifies the corresponding order entry 41 (FIG. 9) for the order 40 assigned to a route 70 (step 1356 of FIG. 15) and accesses the order entry 41 to obtain the product information 43, location information 44, and schedule information 45 (step 1358 of FIG. 15). The DPM 600 then combines the data element requirements 33 and exceptions 34 with the product information 43, location information 44, and Scheduling information 45, in the correct sequence, to generate the workflow 60 (FIG. 14) for the delivery person to follow for that particular order (step 1360 of FIG. 15). The workflow 60 (FIG. 14) may be stored by the central server 100 (step 1362 of FIG. 15) for later access. Examples of specific generated workflows 60 are discussed in detail below.

Figure 16:
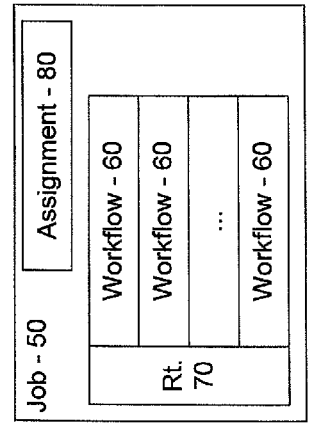
FIG. 16 is a block diagram of a job according to one embodiment of the present invention.

Once the DPM 600 has generated all the workflows 60 for each order 40 assigned to a route 70, the DPM 600 may combine all such workflows 60 together with the information from the assignment 80 to generate the job 50 as shown in FIG. 16 (step 1370 of FIG. 3). Once generated, the job 50 can be saved by the central server 100 for later use (step 1390 of FIG. 3).

When called upon, the DPM 600 can transform the job 50, and the information associated with the job 50, into instructions in the appropriate language (step 1400 of FIG. 2) for the shell program application 208 of the remote device 12. The DPM 600 may transform or convert the information itself, or call on other applications and modules to assist in the process. The DPM 600 can be initiated by the system administrator to create the instructions to be sent out, or the DPM 600 may be called upon by a remote device 12, at the direction of the delivery person, to send the instructions. Regardless of what calls for the generation of the instructions, the Data Transmission Management Module ("DTMM") 700 (FIG. 6) can transmit the instructions in accordance with whatever protocol is required by the chosen network options discussed above (step 1500 of FIG. 2).

Upon receiving the instructions over the network 200, the remote device 12 uses the shell program application 208 to configure the job 50 as required (step 1600 of FIG. 2). For example, the remote device 12 can generate the route 70 for the job 50, the locations 44 for each stop, workflows 60 to be followed at each stop, and directions (which may be provided by the assignment 80) from location to location, and provide them to the delivery person assigned to the job 50.

Figures 17, 18:
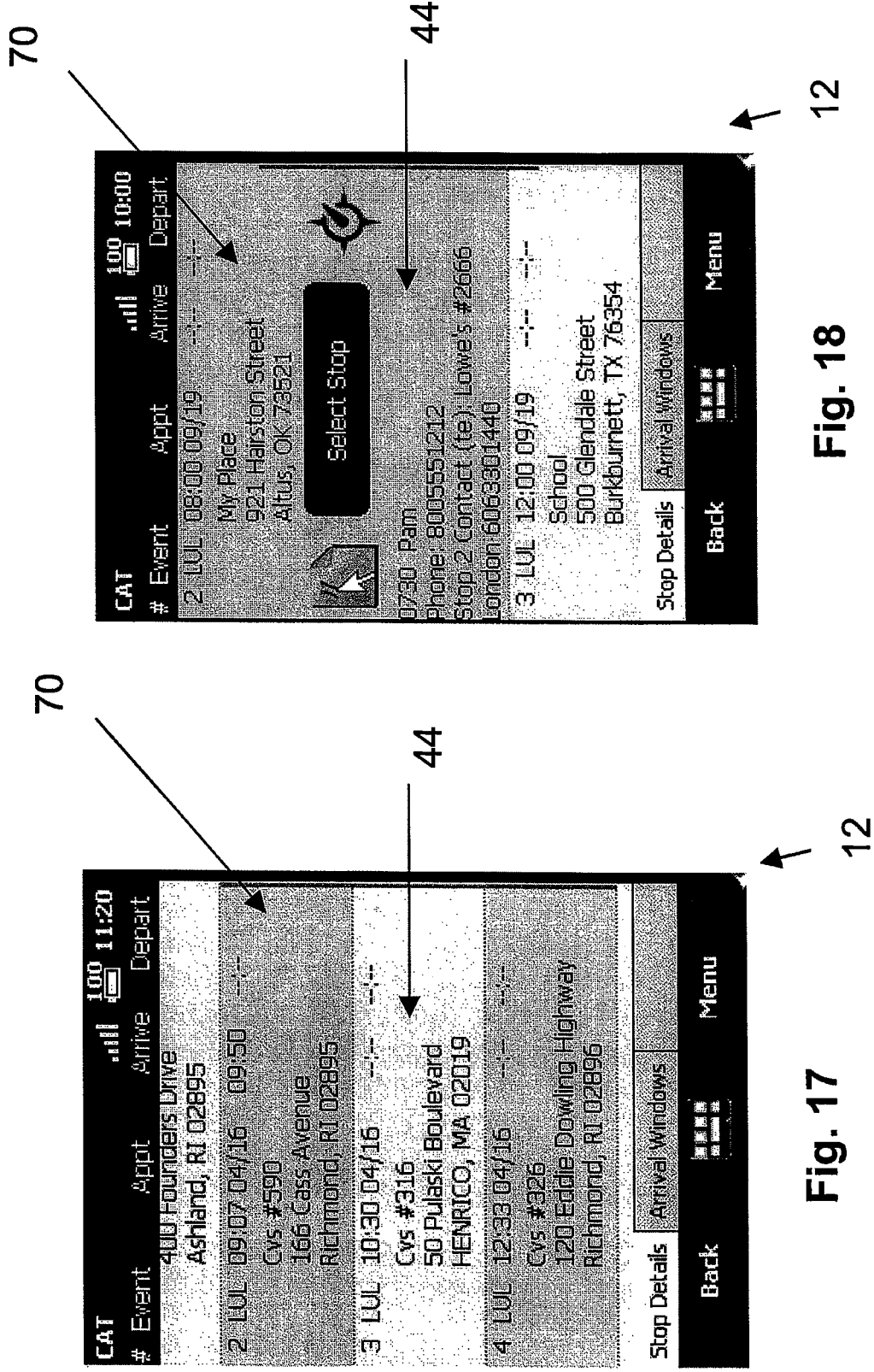
FIGS. 17-18 are screen shots of a remote hand held device displaying a route according to one embodiment of the present invention.

Once the job 50 has been formatted on the remote device 12, the delivery person can access the information associated with the job 50, and begin to fulfill the orders by following the workflows 60 (step 1700 of FIG. 2). For example, as shown in FIG. 17, the remote device 12 may display the route 50 with the locations 44 for each stop of each order 40. FIG. 18 illustrates the remote device 12 displaying the option to select a particular location 44 to start a delivery along the route 70 to initiate and complete a workflow 60 (not shown). The delivery person may select a particular location 44 through the various interface means discussed above.

Figure 21:
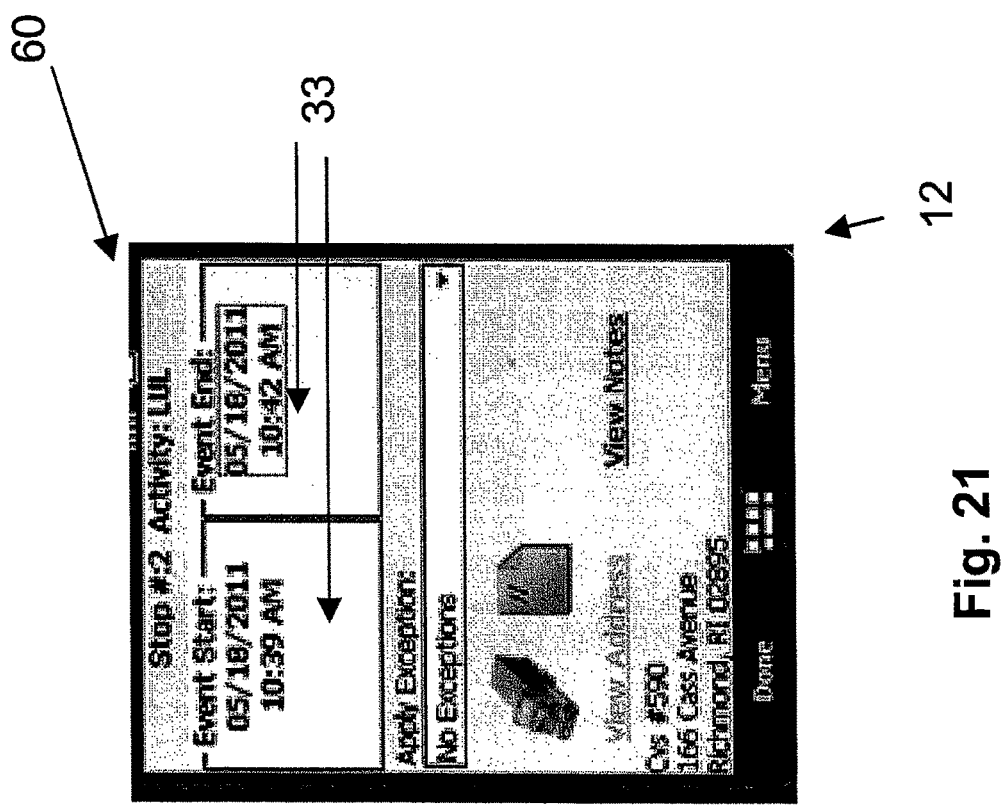

FIGS. 19-21 illustrate a simple work flow 60 that calls for the delivery person to enter the arrival time and the departure time as required by the data element requirements 33. The delivery person follows the workflow by entering the arrival time (FIG. 20) and the departure time (FIG. 21) for the location 44.

Figure 22:
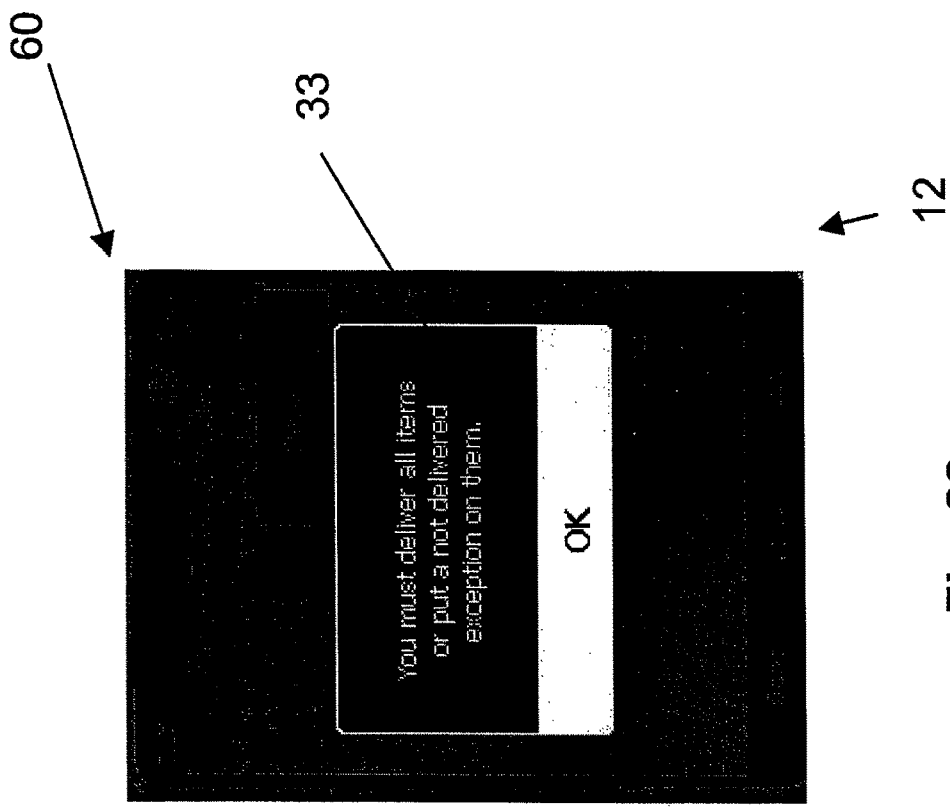
FIGS. 22-27 are screen shots of a remote hand held device displaying various steps of a workflow method according to one embodiment of the present invention.
Figure 24:
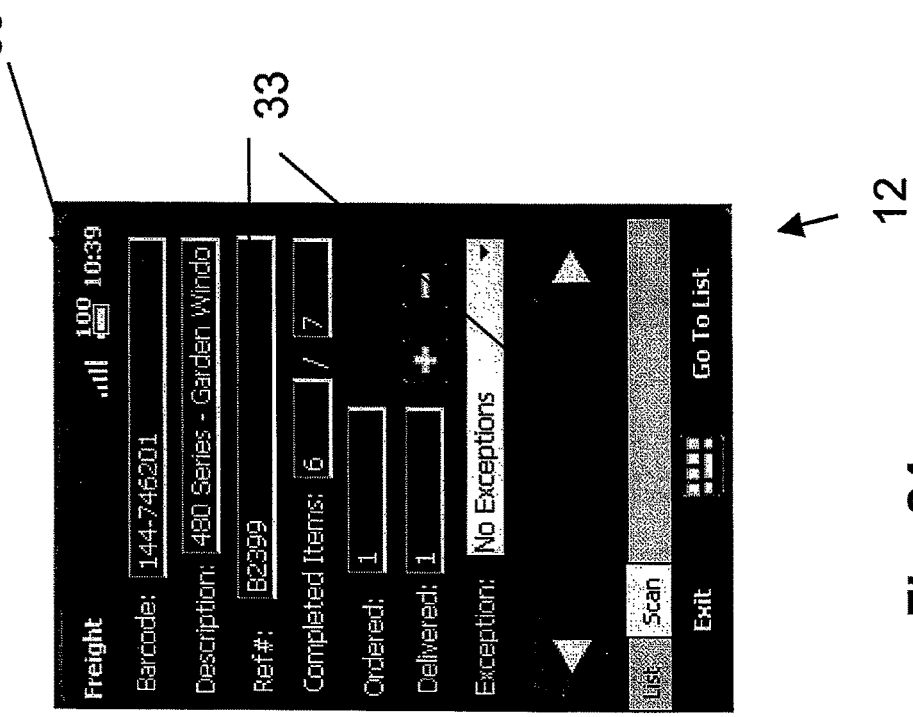
Figure 23:
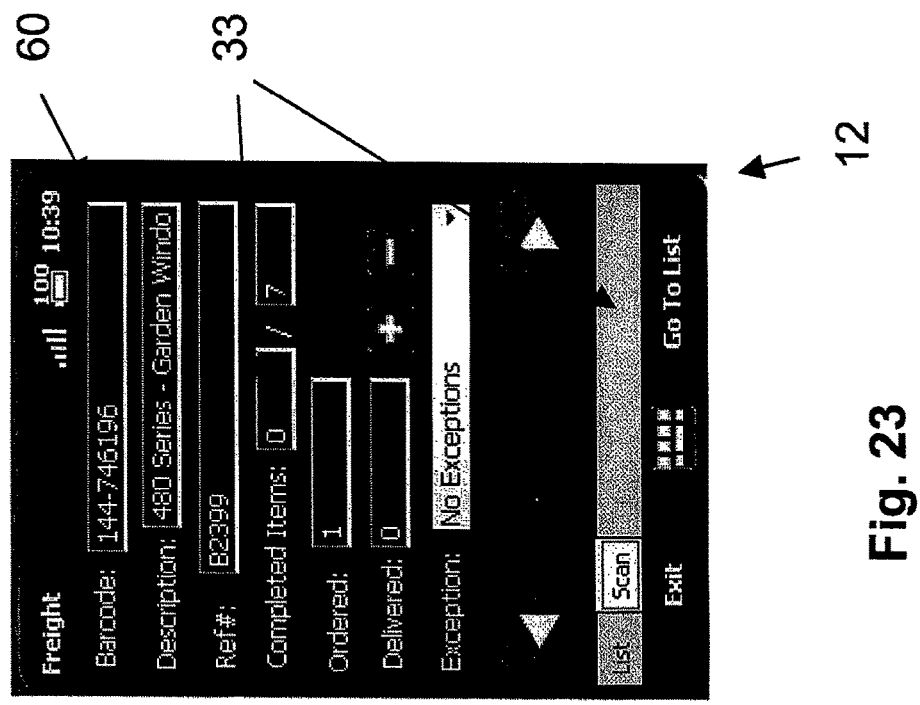
Figure 25:
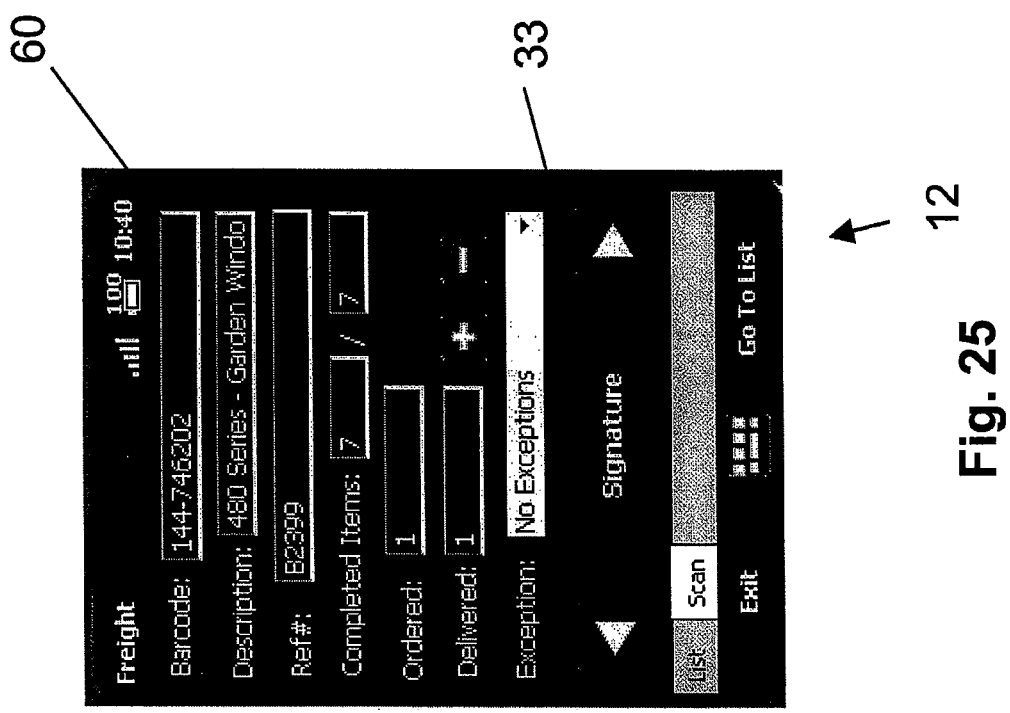
Figure 27:
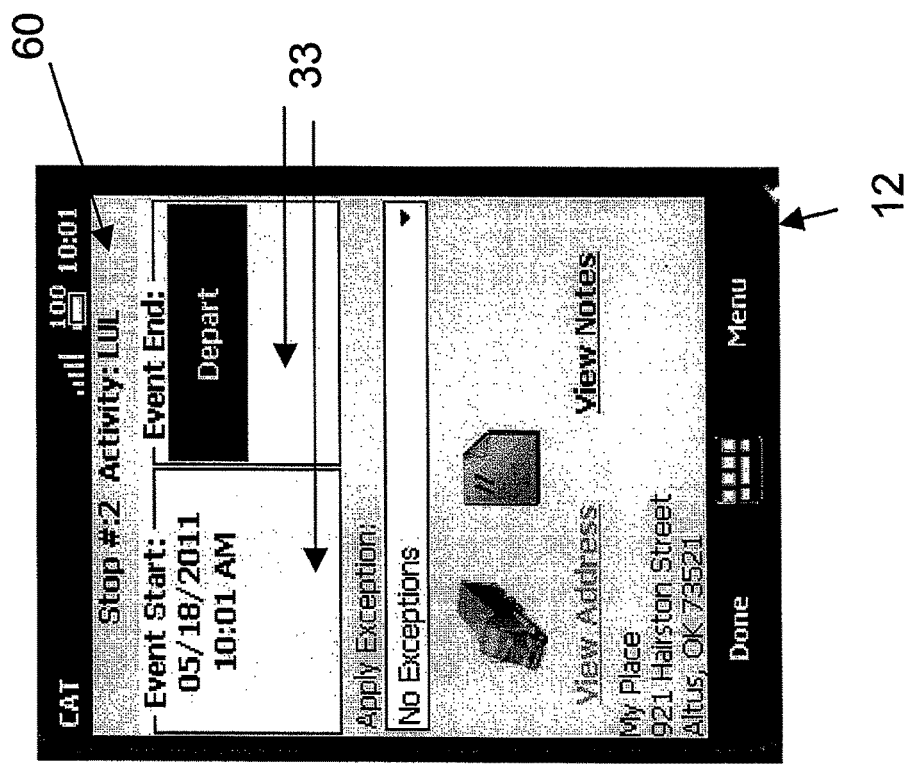
Figure 26:
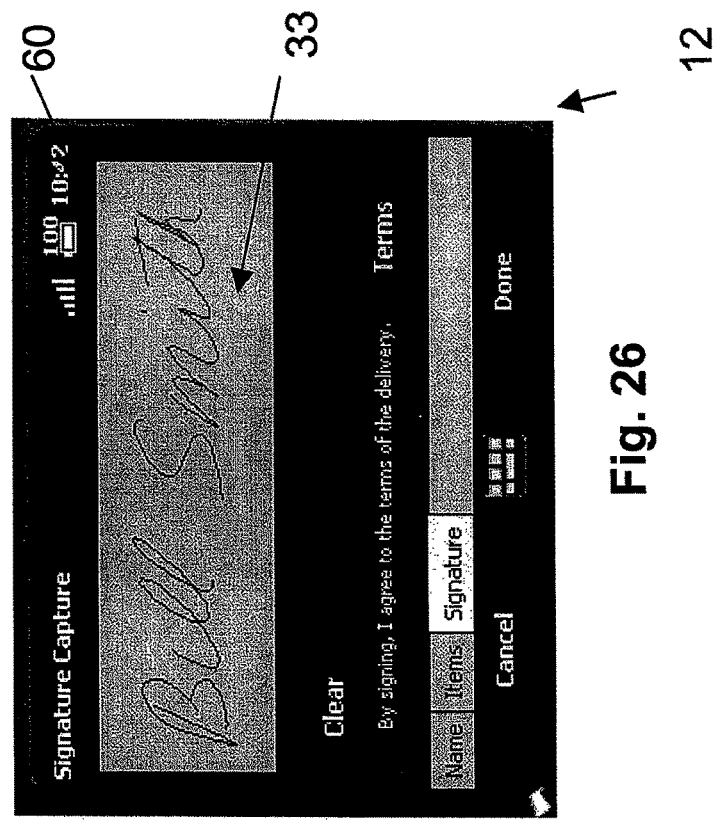

FIGS. 22-27, however, illustrate a more complex workflow 60 that the delivery person must follow after entering the arrival time. As shown in FIG. 22, the workflow 60 requires that the delivery person scan all items (data element requirements) 33 or provide an exception 34. As shown in FIGS. 23-25, the product barcodes must be entered. Upon completing the scanning, a signature (data element) 33 is required (FIG. 26). Once the signature is obtained, the departure time (data element) 33 can then be entered to complete the workflow 60 (FIG. 27).

As the delivery person performs the requirements and actions of the workflow 60, the remote device 12 collects the entered data elements 33 and exceptions 34 and transmits the collected data 90 (FIG. 1) back to the central server 100 for data collection (step 1800). The central server 100 can then store the data 90 within its own mass storage device 110 or with other servers or nodules. The dynamic workflow application 104, as well as other applications, can then use and store the data received for various purposes. For example, the TSMM 500 can use the collected data 90 for accounting and performance evaluation purposes. In addition, the data 110 may be made available to the customers. For example, the dynamic workflow application 104 may include the Data Visibility Portal Module ("DVPM") 800 (FIG. 6) which can provide real time data to the customer regarding the customer's order fulfillment. For example, the DVPM 800 may be an interactive website that allows a customer access to all the data collected for a particular order.

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. For example, certain modules described above may be associated with software applications other than the dynamic workflow application. For illustrative purposes, in some embodiments of the present invention, the CMM, the OMM, the TSMM, the DPM, the DTMM, and the DVPM may be associated with separate software applications, with the DPM only being associated with the dynamic workflow application. Accordingly, the present invention is not limited to the specific embodiments as illustrated herein, but is only limited by the following claims.

What is claimed is:

1. A method of distributing workflows over a network to a remote device, the method comprising:
   a. providing a shell application on the remote device, the remote device comprising:
      i. a microprocessor;
      ii. a memory for storing the shell application;
      iii. a user interface; and
      iv. a network transceiver;
   b. receiving orders at a central server, the central server remote from the remote device and comprising:
      i. a microprocessor,
      ii. a network adapter configured to communicate across the network; and
      iii. a memory that stores customer profiles and the orders, wherein the microprocessor:
         A. obtains the orders, via an order management module, by customer and associates a corresponding customer profile with the order;
         B. generates workflows, via a data process module, for each order based upon the order and the corresponding customer profile, the workflow including information obtained from the order and the customer profile;
         C. assigns, via a transportation/service management module, the workflows to a user of the remote device; and
         D. transforms the workflows into instructions for the remote device for transmission over the network;
   c. transmitting the instructions over the network to the remote device, wherein the remote device does not contain customer profiles, wherein, upon receipt of the instructions, the microprocessor, via the shell application, of the remote device:
      i. generates the workflows from only the transmitted instructions;
      ii. displays the workflows on the remote device for the user to follow via the user interface in order to complete the order; and iii. captures data submitted by the user using the user interface as the user follows the workflows; and d. receiving, via transmission from the remote device, the captured data supplied as the user performs the workflows.

2. The method of claim 1, wherein the customer profiles comprise delivery requirements, data element requirements, exceptions, and sequences of the data element requirements and the exceptions, and the orders comprise product information, delivery location information, and schedule information, wherein the workflows are formed by the data process module obtaining the product information, the data element requirements, and the exceptions from the customer profiles and the orders, wherein the data element requirements and the exceptions are placed in order due to the sequences.

3. The method of claim 2, wherein the order management module assigns a portion of the orders to a route, wherein the route is assigned to the user of the remote device, the route determined by the delivery location and the schedule information of the portion of the orders assigned to the user, wherein the data process module further transforms the route and the portion of the orders into the instructions for the remote device, wherein the remote device further generates the route and the portion of the orders from the instructions.

4. The method of claim 3, wherein the delivery requirements comprise GPS settings, wherein the remote device utilizes the GPS settings for following the route.

5. The method of claim 3, wherein the remote device displays the route with locations for each order, wherein the user initiates the workflow for the location by selecting the location via the user interface upon arriving at the location for the order.

6. The method of claim 2, wherein the data element requirements comprise actions to be performed by the user of the remote device as the user follows the workflows.

7. The method of claim 6, wherein the exceptions correlate to the data elements, wherein the user submits the exception when the actions required by the data element requirements cannot be performed.

8. The method of claim 1, wherein the network comprises a wireless network.

9. The method of claim 8, wherein the user of the remote device calls upon the central server to send the instructions.

10. The method of claim 1, wherein the workflows comprise detailed steps for the user of the remote device to follow.

11. A method for fulfilling orders in a carrier based system, comprising:
 a. generating, at a central server via a customer maintenance module, a profile for a plurality of customers, comprising, for each customer:
  i. creating a profile identifier associated with the customer;
  ii. creating shipping requirements;
  iii. creating required data element fields;
  iv. creating corresponding exceptions to the required data element fields; and
  v. placing the required data element fields and the corresponding exceptions in a sequence provided by the customer;
 b. receiving, at the central server via an order management module, orders from at least a portion of the plurality of customers, wherein each order comprises:
  i. an order identifier corresponding to the profile identifier of the customer submitting the order;
  ii. product information comprising a product identifier and a product quantity;
  iii. a stop location; and
  iv. a time requirement;
 c. generating, at the central server via the order management module, routes, wherein the routes are based upon the stop locations of the orders, the order identifiers, the product information, and the time requirement of the portions of the plurality of customer orders;
 d. assigning the routes to users of wireless remote devices;
 e. creating, at the central server via a data process module, jobs for the users of the wireless remote devices, whereby creating the job comprises:
  i. generating a workflow for each stop location from the routes, wherein generating a workflow comprises:
   A. obtaining the required data element fields, the corresponding exceptions, and the order of the required data element fields and the corresponding exceptions associated with the order identifier and associated with each stop location;
   B. obtaining the product identifier, the product quantity, and the time requirement from each order assigned to the route; and
   C. generating the workflow for each order based upon the required data element fields, the corresponding exceptions, the order of the required data element fields and the corresponding exceptions, the product identifier, the product quantity and the time requirement; and
  ii. combining the route, the directions, and the workflow into the job;
 f. creating, by and at the central server via the data process module, instructions for the jobs, wherein creating instructions comprises transforming the jobs into a programming language that can be read by a shell program application found on the wireless remote devices;
 g. wireless transmitting, from the central server, the instructions to the wireless remote devices, wherein the shell program application of the wireless remote devices generate the jobs and the workflows of the jobs, the wireless remote devices absent of stored customer profiles and order profiles;
 h. completing, at each wireless remote device, the workflow for each stop location by collecting data, wherein collecting data comprises obtaining information entered for each required data element field or the corresponding exceptions;
 i. wireless transmitting, by each wireless remote device, the data from each stop location from each wireless remote device to a data collection database associated with the central server;
 j. compiling, at the central server, the data into reports, settlements, and bills for each customer associated with each stop location; and
 k. providing access, at the central server, for the customer to the data from each stop location.

12. A dynamic workflow system for generating work flows to be completed on wireless remote devices, the dynamic workflow system comprising:
 a. the wireless remote devices comprising:
  i. a shell program application; and
  ii. a user interface;
 b. a central server, wherein the central server comprises:
  i. applications configured to: a dynamic workflow application comprising:

A. a customer maintenance module configured to generate profiles from data obtained from customers, wherein the profiles comprise;
  a. a profile identifier;
  b. data element requirements;
  c. exceptions; and
  d. a sequence to the data element requirements and exceptions;
B. an order management module configured to receive and store orders from the customers in order entries, wherein the order entries comprise:
  a. an order identifier;
  b. product information;
  c. product quantity information; and
  d. delivery location information;
C. a data process module configured to:
  a. generate workflows for the orders, wherein the workflows are generated from the data element requirements, the exceptions, and the sequence obtained from the profiles associated with the orders and the product information, the product quantity information, and the delivery location information from the orders; and
  b. translate the workflows into instructions for the shell program application of the wireless remote devices; and ii. a network adapter configured to send the instructions to and receive data from the wireless remote devices over a wireless network, wherein each remote device is configured to:
  A. receive the instructions from the central server;
  B. generate, via the shell application, the workflows from the instructions, wherein the shell application generates the workflows from only the instructions, the wireless remote device having no stored customer and order profiles;
  C. provide the workflows, via a user interface, for a user of the wireless remote device to follow;
  D. collect information required by the workflows, wherein the information is determined by the data element requirements and the exceptions obtained from the profiles and included in the workflows, and is entered into the wireless remote device by the user via the user interface;
  E. transform the collected information into captured data; and
  F. transmit the captured data to the network adapter of the central server for use by the applications.

* * * * *